US006360156B1

(12) United States Patent
Morganroth et al.

(10) Patent No.: US 6,360,156 B1
(45) Date of Patent: Mar. 19, 2002

(54) METHOD AND SYSTEM OF DETERMINING AN ACCEPTABLE TORQUE LEVEL TO BE APPLIED TO AT LEAST ONE CLUTCH PACK OF AN AUTOMOBILE

(75) Inventors: David Morganroth, Gaines; Marek L. Wilmanowicz, Pinckney, both of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/703,996

(22) Filed: Nov. 1, 2000

(51) Int. Cl.$^7$ .............................. G06F 7/00; G06F 9/00; G06F 17/00; G06F 19/00; G06F 13/00; G06F 165/00

(52) U.S. Cl. .............................. 701/69; 701/69; 701/56; 701/61; 701/67; 701/82; 701/84; 701/51-54; 701/71-75; 701/87-95; 73/862.191; 73/862.28; 73/116; 180/197; 180/233; 180/248; 180/247; 303/121; 303/143; 475/86; 475/150; 475/89; 477/125; 477/105; 477/110; 477/62; 477/43; 477/108; 477/176

(58) Field of Search .............................. 701/69, 56, 61, 701/67, 82, 84, 51–54, 71–75, 87–95; 73/862.191, 116, 862.28, 488; 180/197, 233, 248, 247, 249; 303/121, 143, 190; 475/86, 150, 89; 477/125, 105, 110, 62, 43, 63, 78, 121, 108, 176

(56) References Cited

U.S. PATENT DOCUMENTS

| | | | | |
|---|---|---|---|---|
| 5,501,109 A | * | 3/1996 | Naito et al. ............ 73/862.191 |
| 5,608,626 A | * | 3/1997 | Ibamoto et al. ................ 701/51 |
| 5,752,211 A | * | 5/1998 | Takasaki et al. ............... 701/69 |
| 6,208,929 B1 | * | 3/2001 | Matsuno et al. ............... 701/89 |
| 6,278,915 B1 | * | 8/2001 | Deguchi et al. ............... 701/22 |
| 6,298,300 B1 | * | 10/2001 | Ohyama et al. ............ 701/103 |

* cited by examiner

Primary Examiner—William A. Cuchlinski, Jr.
Assistant Examiner—Ronnie Mancho
(74) Attorney, Agent, or Firm—Anthony Luke Simon

(57) ABSTRACT

A method is provided for determining an acceptable torque level to be applied to at least one clutch pack (of an automobile) which includes the requirement of internal slip to transmit torque. The automobile includes a plurality of wheels. A velocity is sensed at each of the plurality of wheels of the automobile. A speed information value is calculated. The speed information value is a function of the sensed velocities at each of the plurality of wheels. The speed information value is then compared with a calibration table. Finally, the acceptable torque level is determined primarily from the calibration table based on the speed information value.

20 Claims, 4 Drawing Sheets

METHOD AND SYSTEM OF DETERMINING AN ACCEPTABLE TORQUE LEVEL TO BE APPLIED TO AT LEAST ONE CLUTCH PACK OF AN AUTOMOBILE

FIELD OF THE INVENTION

The present invention relates to automotive adjustment and control systems, and, more particularly, to a method and system of determining an acceptable torque level to be applied to at least one clutch pack of an automobile.

BACKGROUND OF THE INVENTION

All-wheel drive transmission systems, and specifically, torque on demand all-wheel drive transmissions systems, provide a means to control the tractive effort of an automobile as applied to a road surface. In current usage, all-wheel drive transmission systems, however, provide a mechanical means of transferring the generated torque, applied to a clutch pack, from the front to the rear of an automobile. However, the current methods, in addition to not being able to provide for an electronic means of torque dissipation, are also not as efficient in that they do not provide for an accurate means of reducing, and not just dissipating, the torque applied to the clutch packs of an automobile.

Accordingly it would be desirable to have a method and system for determining an acceptable torque level that overcomes the above disadvantages.

SUMMARY OF THE INVENTION

The present invention provides a method of determining an acceptable torque level to be applied to at least one clutch pack (of an automobile) which includes the requirement of internal slip to transmit torque. The automobile includes a plurality of wheels. A velocity is sensed at each of the plurality of wheels of the automobile. A speed information value is calculated. The speed information value is a function of the sensed velocities at each of the plurality of wheels. The speed information value is then compared with a calibration table. Finally, the acceptable torque level is determined primarily from the calibration table based on the speed information value.

Another aspect of the present invention provides for a computer usable medium for storing a program for determining an acceptable torque level to be applied to at least one clutch pack (of an automobile) which includes the requirement of internal slip to transmit torque. The automobile includes a plurality of wheels. A velocity is sensed, by computer readable program code, at each of the plurality of wheels of the automobile. A speed information value is calculated by computer readable program code. The speed information value is a function of the sensed velocities at each of the plurality of wheels. The speed information value is then compared with a calibration table by computer readable program code. From this comparison of the speed information value with the calibration table, acceptable torque level is determined by computer readable program code.

Another aspect of the present invention provides for a system for determining an acceptable torque level to be applied to at least one clutch pack (of an automobile) which includes the requirement of internal slip to transmit torque. The automobile includes a plurality of wheels. A sensing means senses a velocity at each of the plurality of wheels of the automobile. A speed information value is then calculated by a calculating means. The speed information value is a function of the sensed velocities at each of the plurality of wheels. The speed information value is then compared with a calibration table by a comparing means. From this comparison of the speed information value with the calibration table, a determining means determines the acceptable torque.

BRIEF DESCRIPTION OF THE DRAWINGS

The above, and other objects, advantages and features of the present invention will be more readily understood from the following detailed description of the preferred embodiments thereof, when considered in conjunction with the drawings, in which like reference numerals indicate identical structures throughout the several views, and wherein.

DETAILED DESCRIPTION OF THE PRESENTLY PREFERRED EMBODIMENTS

One embodiment of the present invention is preferably for use within a torque-on-demand all-wheel drive transmission system. However, the aspects of the present invention may be additionally applicable to other transmission systems. Furthermore, the present invention, which may take the form of Energy Reduction Software, has been developed, for example, in an effort to provide protection for and extend the usable time of the Rear Drive Module of the all-wheel drive transmission system.

The Rear Drive Module of the preferred all-wheel drive system may be any Rear Drive Module currently used in the art, such as, for example, a Steyr Twin Geromatic Rear Drive Module. Preferably, the Rear Drive Module of the present invention comprises a torque on-demand all-wheel drive transmission system for front-wheel drive automobiles. On roads that provide good grip and/or traction, such as, for example, dry pavement or asphalt, the automobile acts essentially as a front-wheel drive automobile. That is, the automobile acts with no negative influence on either the automobile handling and/or the driving comfort coming from the all-wheel drive transmission system. If one or both of the front (or, in this case, drive) wheels, however, lose grip and/or traction, the torque on-demand all-wheel drive transmission system automatically activates and is progressively employed, with no driver input required. The arrangement of the Rear Drive Module of the present invention allows both torque transfer from the front to the rear axles, as well as from side to side within a particular axle (i.e., from left to right and vice versa). This axle-related limited slip action provides torque transfer even in the most difficult situations, such as, for example, with two front wheels and one rear wheel on a slippery surface.

The unique design of the Rear Drive Module of the present invention allows torque to be transferred from the front axle to either of the rear wheels independently. That is, whenever one or both of the front wheels develops excessive slip, the torque applied to the front axle is transferred to either side of the rear axle as a function of the speed difference between the front axle and the rear wheels.

The all-wheel drive transmission system may be fully compatible with current anti-lock braking systems and, furthermore, may possess an electronic control unit to protect the drive train from the potential problem of thermal overstress. Furthermore, the on-board electronics of the present invention can detect if an undersized spare wheel is in use, and will shut off the all-wheel drive transmission system in such a case. In order to maintain constant torque application, the Rear Drive Module of the present invention is preferably temperature-compensated over a range of, for example, −20° F. to 200° F.

Figure 1:
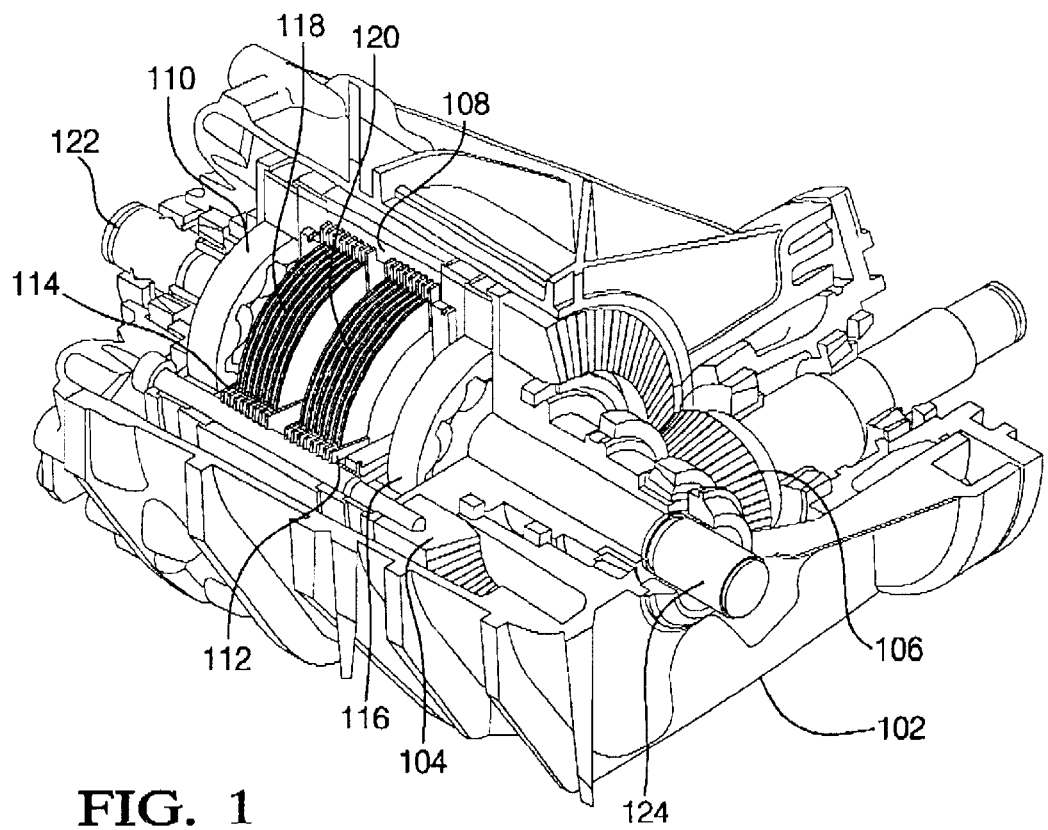
FIG. 1 illustrates a Rear Drive Module, made in accordance with the present invention.

FIG. 1 shows a drawing of a Rear Drive Module 100. The Rear Drive Module shown in FIG. 1 is a twin geromatic module, such as, for example, the Steyr Twin Geromatic Rear Drive Module, as introduced above. The main components of the Rear Drive Module 100 are the housing 102, the ring gear 104 and pinion 106, the Rear Drive Module case 108 containing the two Gerorotor pumps 110, 112, pistons 114, 116 and clutch packs 118, 120, and the output shafts to the wheels 122, 124. The piston carriers (not shown) contain the temperature compensation valves, the pressure relief valves, and pulsation-damping elements. The two pumps 110, 112 transfer the input torque to the left and right output shaft 122, 124, replacing a conventional axle differential.

Figure 2:
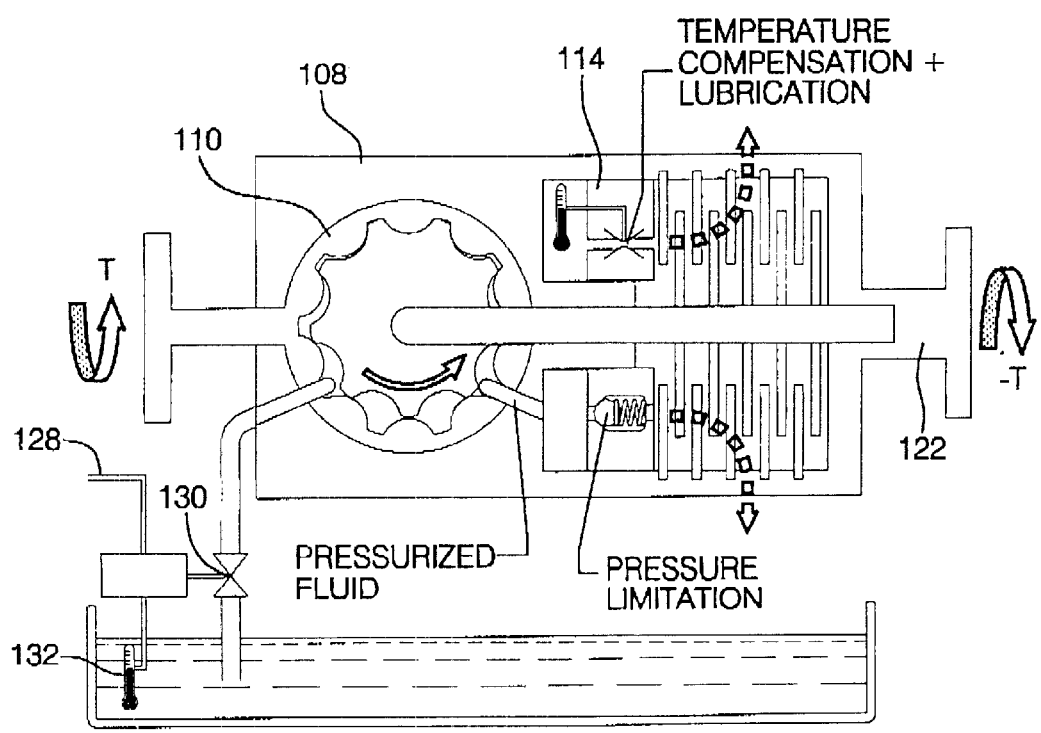
FIG. 2 is a schematic diagram illustrating the hydraulic system of the Rear Drive Module of FIG. 1.

FIG. 2 shows the hydraulic system of the Rear Drive Module 100 of FIG. 1. In the embodiment shown in FIG. 2, the Gerorotor pump 110 is pumping oil from the sump 126 to the pressure side of the piston 114. Pressure is built up according to the differential speed between the Rear Drive Module case 108 and the output shaft 122. The piston 114 compresses the clutch pack 110 and enables torque transfer from the Rear Drive Module case 108 to the shaft 122 via the wet clutch plates. A Geromatic electronic control unit 128 operates a valve 130 at the inlet side of the system of the present invention. If the oil sump temperature, measured by a thermocouple 132, exceeds a predetermined maximum tolerable value, the inlet valve 130 is closed and the system is disabled. In order to protect the system from high dynamic abuse, special algorithms calculate the local energy dissipation and trigger the shutoff signal. The electronic control unit 128 is able to detect the use of a mini-spare wheel and can send a shutoff signal to the inlet valve 130 as well.

Figure 3:
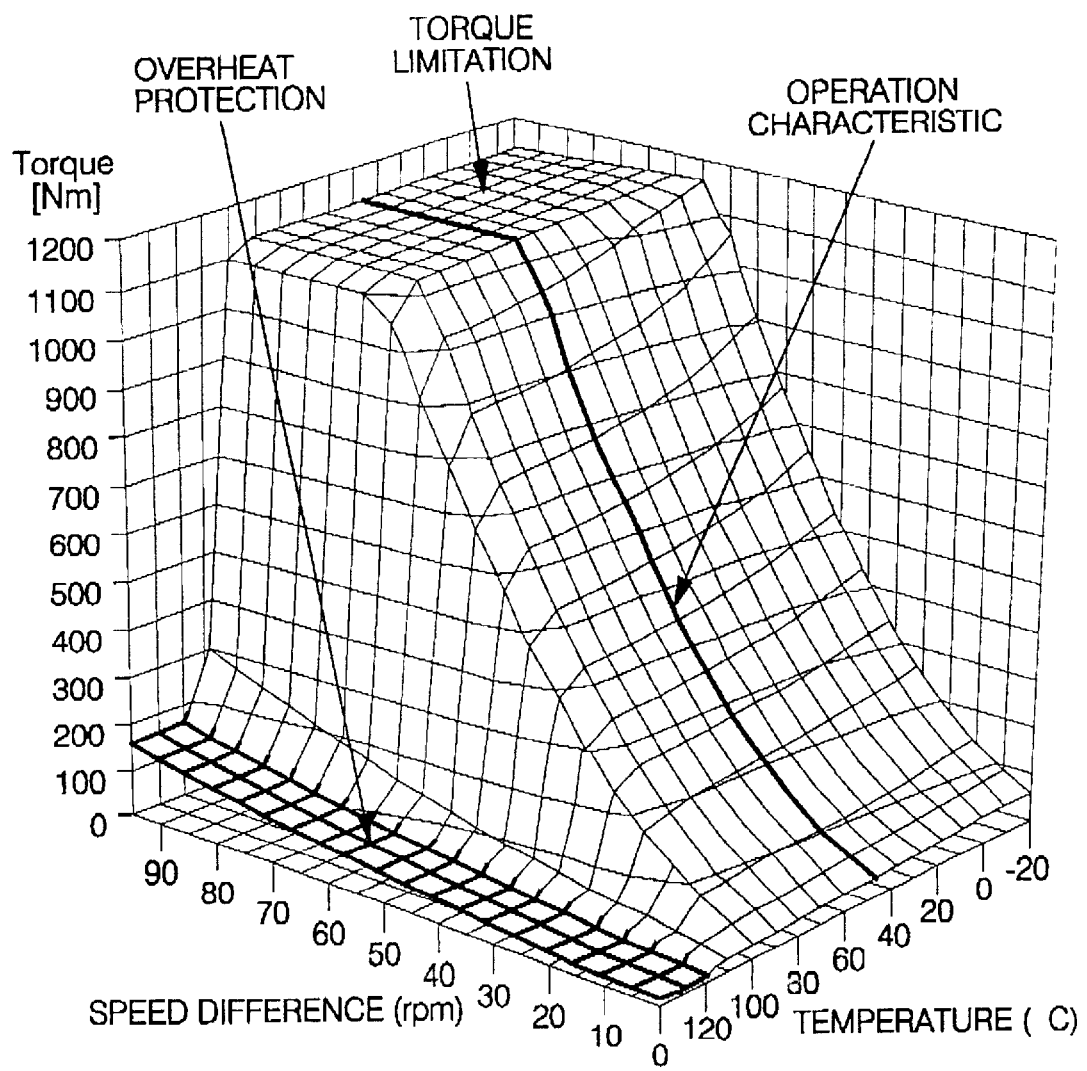
FIG. 3 is a graph illustrating the effect of torque characteristics per differential speed and temperature.

FIG. 3 is a graph illustrating the torque characteristics vs. differential speed and temperature. A temperature compensation valve keeps the torque characteristic constant in a range of −20° F. to 200° F. A pressure limitation valve limits the maximum rear axle torque to a level that provides more than enough tractive force on the one hand and enables the design to be lightweight and efficient on the other hand. At oil sump temperatures beyond 200° F., the system is shut off to prevent damage to the friction plates. As soon as the temperature drops below a safe value, the system reactivates itself.

Preferably, the Rear Drive Module 100 is integrated into the rear suspension system of the automobile. It serves as a torque transfer device between the front and rear axle and replaces the rear axle differential. The propshaft drives the pinion 106 and ring gear 104. The ring gear 104 is part of the Rear Drive Module case 108, which is connected to the outer part of the two Gerorotor pumps 110, 112 and the outer plates of the clutch pack 118, 120. The pump rotor (not shown) and the inner plates (not shown) of the clutch packs 118, 120 are connected to the left and right output shaft 122, 124, respectively.

To meet the stringent design requirements of the all-wheel drive transmission system of the present invention (which includes, inter alia, cost, mass, driving feel and torque-on-demand capability), the Rear Drive Module is preferably designed to use separate clutch packs that are pressurized and allow independent rear wheel engagement based on delta slip. Pressurization occurs through independent Gerorotor pumps known in the art (in which the pressure is mechanically adjusted in response to a differential speed value) which measures the difference between an input value (the average velocity of the front wheels) and the velocities of each of the rear wheels. However, some vehicle maneuvers may be very abusive to the Rear Drive Module clutch packs due to the fact that they are constantly allowed to slip and generate heat. A problem with this is that the generation of excess heat (which is a product of the excess energy applied to the clutch pack, rather than applied as a torque transfer to the rear wheels) is both wasteful and potentially damaging. Thus, one of the advantages of the present invention is to limit the torque to the clutch packs to an amount that provides a satisfactory balance between automotive drivability and protection of the clutch pack.

Therefore, to reduce the amount of heat generated by the clutch packs during engagement, while at the same time maintaining the slip value of the clutch packs, the amount of energy being applied to the clutch packs is preferably reduced. Furthermore, this reduction should be done in a manner that still allows the Rear Drive Module of the present invention to engage the rear wheels and enhance the general automotive performance of the automobile through increased tractive effort. The present invention, described more fully below, balances these requirements by reducing the Rear Drive Module input torque to a value no greater than the slip torque of the system. That is, the automotive tractive effort (which, essentially, is the average tractive effort of all four wheels) can be represented by the amount of energy dissipated in the Rear Drive Module as compared to that being applied to the road surface. Hence, any excess energy that is not applied to the wheels or used to activate the torque-on-demand feature of the Rear Drive Module is converted to heat.

Figure 4:
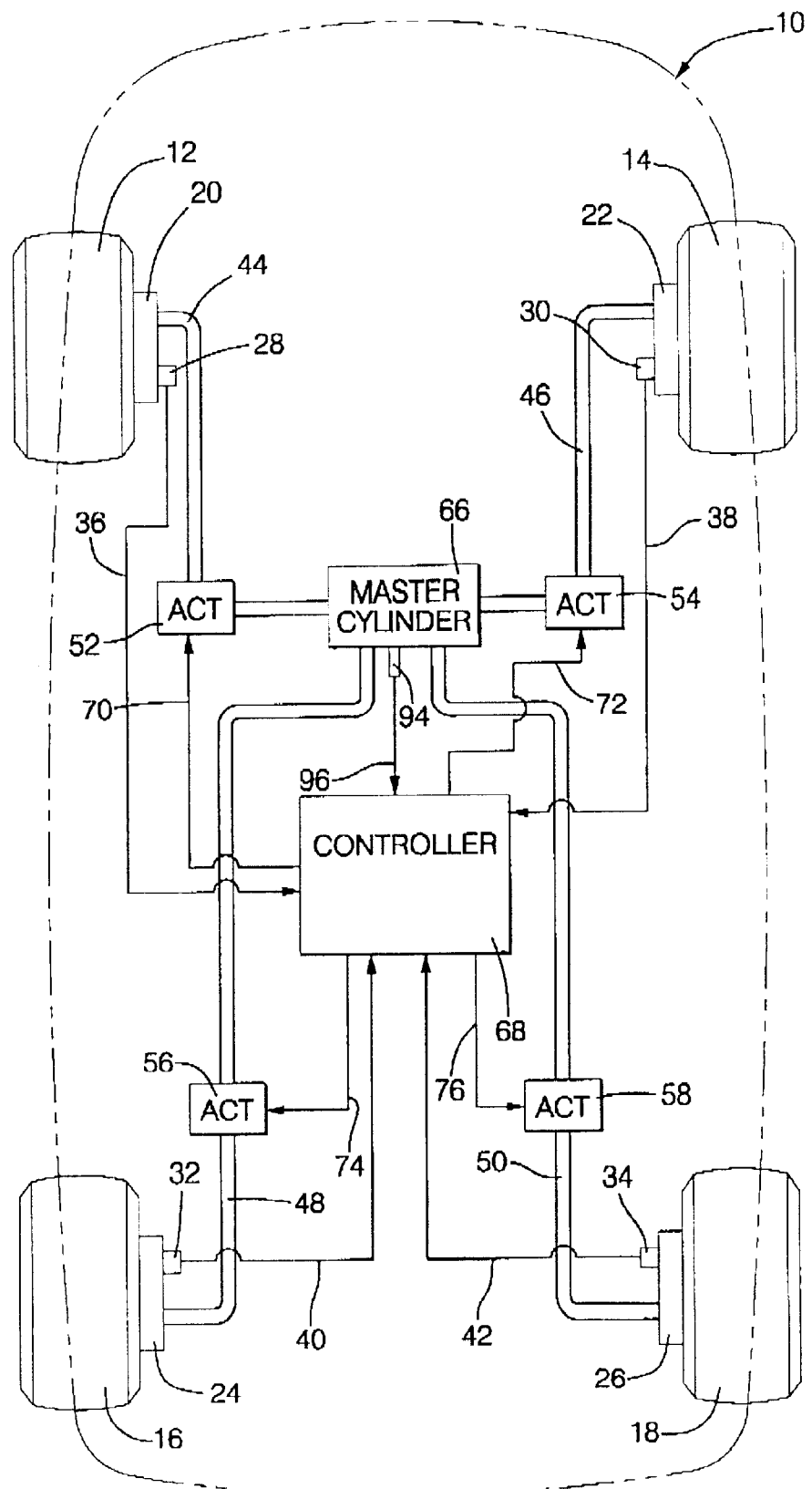
FIG. 4 is a block diagram illustrating a method of determining an acceptable torque level to be applied to at least one clutch pack of an automobile, made in accordance with the present invention.
Figure 5:
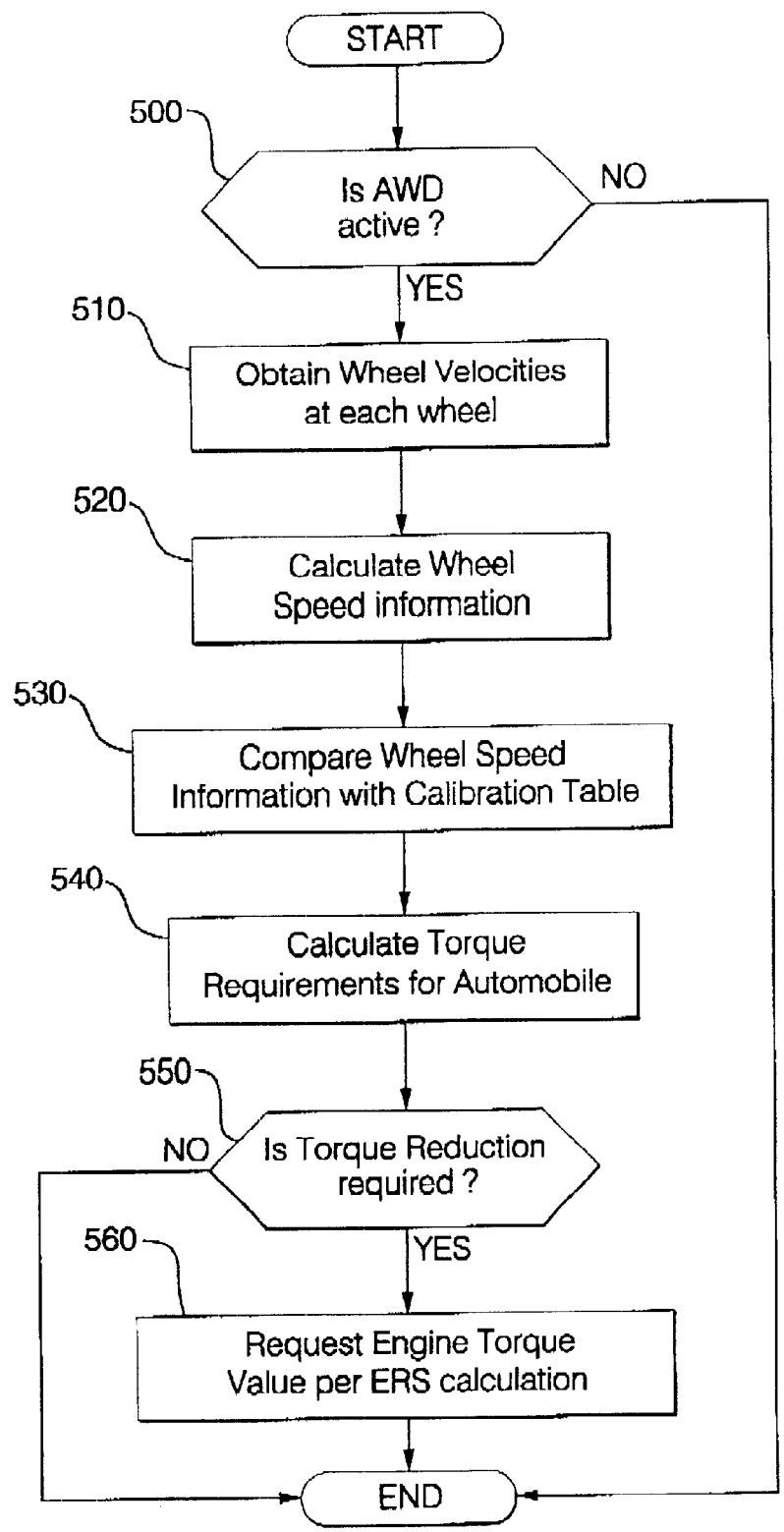
FIG. 5 is a flow chart illustrating a routine of a method of determining an acceptable torque level to be applied to at least one clutch pack of an automobile, made in accordance with the present invention.

Referring to FIGS. 4 and 5, which illustrate a preferred routine of a method of determining an acceptable torque level, the present invention first performs, through a controller 68, a check to determine whether the automobile 10, on which the present invention is preferably implemented, is currently being powered by a torque-on-demand all-wheel drive transmission system (Block 500). As the controller 68 is preferably set up to perform a constant adjustment of the torque level on the torque-on-demand all-wheel drive transmission system, the controller 68 needs to initially confirm that the system has not been deactivated.

Assuming the torque-on demand all-wheel drive transmission system to be active, the controller 68 then senses the velocities at each of the wheels 12, 14, 16, 18 (Block 510). Preferably, each velocity is obtained at an individual wheel; that is, a velocity may be obtained at each of the left front wheel 12, the right front wheel 14, the left rear wheel 16 and the right rear wheel 18. Preferably, the process and method of obtaining the velocity is currently known, and may include, for example, velocity sensors 28, 30, 32, 34 at each wheel 12, 14, 16, 18, respectively, that calculate that particular wheel'ss velocity and transmit that value to the controller 68.

The controller 68 then calculates the torque requirements for the automobile 10, based on the current conditions (Block 520). In doing so, the controller 68 first calculates a speed information value. The speed information value is preferably based on the individual sensed velocities at each of the wheels 12, 14, 16, 18 of the automobile 10. For example, in a preferred embodiment, the speed information value may preferably be calculated by taking the difference between an input value and each of the velocities at the two rear wheels 16, 18, wherein the input value is the average of the velocities of the two front wheels 12, 14. Alternatively, the speed information value may be any other known method of determining the wheel speed difference between the Rear Wheel Drive input (which, as stated above, is essentially the average of the two front wheels 12, 14) and each of the rear wheels 16, 18, independently.

Secondly, the controller 68 then compares the speed information value with a calibration table (Block 530). The calibration table is at the heart of the controller 68, and allows the amount of Rear Drive Module slip to be converted to an acceptable torque level. The calibration table may preferably be a database located remotely from, or integral with, the controller 68, and may include a chart in which the controller 68 can obtain an acceptable torque level by comparing the chart with the speed information value calculated in the previous step. The calibration table preferably contains a pre-determined set of acceptable torque levels, unique to the individual automobile 10, and may be inputted into the controller 68 by a programmer. The calibration table may be determined taking into account Rear Drive Module performance data, heat versus torque transmittal testing, as well as vehicle drive evaluation. Additionally, the calibration table may be altered or amended, by a programmer, according to the specific likes and dislikes of the ultimate consumer—the driver. For example, the calibration table may be altered to provide a higher level of torque for a driver who wishes such. The converse would also be true.

In Block 540, the controller 68 determines the acceptable torque level from the calibration table, based on the calculated speed information value. In this way, the speed information value calculated from each of the wheels 12, 14, 16, 18 is used to determine the amount of torque applied to the road surface versus the amount of torque that is converted to heat within the Rear Drive Module. Thus, the controller 68 is able to detect a situation in which too much torque is being applied, and then to reduce torque levels to the point that optimal torque is being applied to the road rather than being converted to heat. This torque level must remain high enough to maintain rear wheel engagement through the Rear Drive Module; that is, as discussed above, the Rear Drive Module requires slip to transmit torque.

After calculating the acceptable torque level requirements in Block 540, the controller 68 then determines whether torque reduction is required for the automobile 10 at this stage (Block 550). Preferably, the torque level would only require a reduction (and, consequently, the rear wheels 16, 18 would only need engaging) if and when there is an adequate speed difference between the Rear Drive Module input and each of the rear wheels 16, 18, independently. Such would happen in cases in which the speed information value is relatively high.

The controller 68 may perform this function by comparing the current torque level to the acceptable torque level, as determined above. The manner of comparison described here may preferably be accomplished by means of an algorithm that balances the current torque level with the acceptable torque level, to determine which is greater. If the current torque level exceeds the determined acceptable torque level, then the controller 68 preferably transmits a request to reduce the current torque level to a level no greater than the determined acceptable torque level (Block 560). This may be done by instructing the controller 68 to reduce the torque being produced by the engine. The method by which the controller 68 reduces torque is preferably any method, well known in the art, such as the retarding of ignition timing or momentary cessation of fuel delivery to the cylinders. Preferably, additional filtering may be performed on the torque value requested to achieve desired automotive performance.

The controller 68 may periodically perform the process of determining an acceptable torque level. The period in which the controller 68 "reperforms" this process may be determined by the programmer of the controller 68, or by any other presently known means. Constant adjustment of the torque level preferably allows system performance to stabilize at the maximum torque level which can be applied to the road, while still balancing Rear Drive Module engagement versus Rear Drive Module heat generation.

It should be appreciated that the embodiments described above are to be considered in all respects only illustrative and not restrictive. The scope of the present invention is indicated by the following claims rather than by the foregoing description. All changes that come within the meaning and range of equivalents are to be embraced within their scope.

We claim:

1. A method of determining an acceptable torque level to be applied to at least one clutch pack of an automobile, the automobile including a plurality of wheels, comprising:

sensing a velocity at each of the plurality of wheels of the automobile;

calculating a speed information value as a function of the sensed velocities at each of the plurality of wheels;

comparing the speed information value with a calibration table; and determining the acceptable torque level from the calibration table based on the speed information value.

2. The method of claim 1, further comprising determining a current torque level applied to each of the at least one clutch packs.

3. The method of claim 2, further comprising comparing the acceptable torque level to the current torque level.

4. The method of claim 3, further comprising reducing the current torque level.

5. The method of claim 1, wherein the plurality of wheels comprises a first wheel, a second wheel, a third wheel and a fourth wheel; and wherein the speed information value is calculated by taking the difference between an input value and each of the sensed velocities at the third wheel and at the fourth wheel.

6. The method of claim 5, wherein the input value is the average of the sensed velocities at the first wheel and the second wheel.

7. The method of claim 1, wherein the automobile includes an all-wheel drive transmission system.

8. The method of claim 7, wherein the all-wheel drive transmission system comprises a torque-on-demand all-wheel drive transmission system.

9. The method of claim 8, wherein each of the at least one clutch packs requires a slip value to transmit torque.

10. The method of claim 1, wherein the acceptable torque level is determined periodically.

11. A computer usable medium storing a program for determining an acceptable torque level to be applied to at least one clutch pack of an automobile, the automobile including a plurality of wheels, comprising:

computer readable program code that senses a velocity each of the plurality of wheels of the automobile;

computer readable program code that calculates a speed information value as a function of the sensed velocities at each of the plurality of wheels;

computer readable program code that compares the speed information value with a calibration table; and computer readable program code that determines the acceptable torque level from the calibration table based on the speed information value.

12. The program of claim 11, further comprising:

computer readable program code that determines a current torque level applied to each of the at least one clutch packs.

13. The program of claim 12, further comprising:

computer readable program code that compares the acceptable torque level to the current torque level.

14. The program of claim 13, further comprising:

computer readable program code that reduces the current torque level.

15. The program of claim 1, wherein the plurality of wheels comprises a first wheel, a second wheel, a third wheel and a fourth wheel; and wherein computer readable program code calculates the speed information value by taking the difference between an input value and each of the sensed velocities at the third wheel and at the fourth wheel.

16. A system for determining an acceptable torque level to be applied to at least one clutch pack of an automobile, the automobile including a plurality of wheels, comprising:

sensing means for sensing a velocity at each of the plurality of wheels of the automobile;

calculating means for calculating a speed information value as a function of the sensed velocities at each of the plurality of wheels;

comparing means for comparing the speed information value with a calibration table; and determining means for determining the acceptable torque level from the calibration table based on the speed information value.

17. The system of claim 16, further comprising:

means for determining a current torque level applied to each of the at least one clutch packs.

18. The system of claim 17, further comprising:

means for comparing the acceptable torque level to the current torque level.

19. The system of claim 18, further comprising:

means for reducing the current torque level.

20. The system of claim 19, wherein the plurality of wheels comprises a first wheel, a second wheel, a third wheel and a fourth wheel; and wherein the speed information value is calculated by taking the difference between an input value and each of the sensed velocities at the third wheel and at the fourth wheel.

* * * * *